United States Patent
Chovanec et al.

(10) Patent No.: US 10,896,797 B2
(45) Date of Patent: Jan. 19, 2021

(54) DEAD TANK CIRCUIT BREAKER SURGE ARRESTER

(71) Applicant: GENERAL ELECTRIC TECHNOLOGY GMBH, Baden (CH)

(72) Inventors: Andrew Chovanec, Charleroi, PA (US); Victor Federico Hermosillo, Charleroi, PA (US)

(73) Assignee: GENERAL ELECTRIC TECHNOLOGY GMBH, Baden (CH)

( * ) Notice: Subject to any disclaimer, the term of this patent is extended or adjusted under 35 U.S.C. 154(b) by 57 days.

(21) Appl. No.: 16/432,122

(22) Filed: Jun. 5, 2019

(65) Prior Publication Data

US 2020/0388456 A1 Dec. 10, 2020

(51) Int. Cl.

| | |
|---|---|
| *H01H 83/10* | (2006.01) |
| *H01H 33/16* | (2006.01) |
| *H01H 33/02* | (2006.01) |
| *H02H 9/04* | (2006.01) |
| *H01C 7/12* | (2006.01) |
| *H02H 3/08* | (2006.01) |
| *G05F 1/10* | (2006.01) |
| *H01H 83/00* | (2006.01) |

(52) U.S. Cl.
CPC .......... *H01H 83/10* (2013.01); *H01H 33/027* (2013.01); *H01H 33/161* (2013.01); *H02H 9/04* (2013.01); *G05F 1/10* (2013.01); *H01C 7/12* (2013.01); *H01H 83/00* (2013.01); *H02H 3/08* (2013.01); *H02H 9/042* (2013.01)

(58) Field of Classification Search
USPC ................. 361/118, 120, 123, 127
See application file for complete search history.

(56) References Cited

U.S. PATENT DOCUMENTS

| | | | |
|---|---|---|---|
| 9,728,362 B2 | 8/2017 | Shinde et al. | |
| 2015/0364285 A1* | 12/2015 | Shinde | H01H 83/10 361/118 |

FOREIGN PATENT DOCUMENTS

| | | |
|---|---|---|
| EP | 2880669 B1 | 7/2017 |
| FR | 2 621 734 A1 | 4/1989 |
| WO | 2015/191202 A1 | 12/2015 |

OTHER PUBLICATIONS

Search Report & Written Opinion issued in PCT/EP2020/065575, dated Aug. 20, 2020, 13 pages.

* cited by examiner

*Primary Examiner* — Danny Nguyen (74) *Attorney, Agent, or Firm* — Eversheds Sutherland (US) LLP (57) ABSTRACT

Embodiments of the disclosure can include systems and methods for limiting transient over-voltages occurring across a circuit breaker. These embodiments include providing a middle tank portion. They further include providing a first portion coupled to a first side of the middle tank portion, and a second portion coupled to a second side of the middle tank portion. They further include providing a first high voltage terminal coupled to the first portion, and a second high voltage terminal coupled to the second portion. They further include providing a post insulator supported and extending from the middle tank portion. They further include providing a first surge arrester connecting the first high voltage terminal to a first connector extending from the post insulator, and a second surge arrester connecting the second high voltage terminal to a second connector extending from the post insulator.

20 Claims, 5 Drawing Sheets

DEAD TANK CIRCUIT BREAKER SURGE ARRESTER

TECHNICAL FIELD

The disclosure relates to circuit breakers and surge arresters.

BACKGROUND

Utilities are struggling with the increasing challenge of integrating renewable energy sources into the grid. Integration can conflict with existing modernization and optimization plans. Issues of reliability, safety, power quality and economics have to be taken into account when planning substations and choosing switchgear. Power systems are interconnected highly complex networks that are susceptible to instabilities such as lighting, strong winds, and seismic activity. One component of power systems which is responsible for protecting electrical equipment and infrastructure, as well as fulfilling operational and safety functions, is a dead tank circuit breaker. In normal operation, conventional dead tank circuit breakers carry nominal load currents, and depending on the installation, switch various equipment such as relatively high and medium voltage electrical lines or transformers. When a fault occurs, it is the job of the dead tank circuit breaker to interrupt short circuit currents, specifically those that may reach about 20 to 25 times the rated nominal current. The magnitude of the interrupted power may be of an order comparable to the power consumption of a relatively major city.

Even though the function of the conventional dead tank circuit breaker is to protect electrical equipment and infrastructure, sometimes the dead tank circuit breaker is still susceptible to over-voltage transients. Conventional surge arresters help protect dead tank circuit breakers when they being to experience over-voltage transients. Surge arresters that are attached to the poles of dead tank circuit breakers lacking adequate support can be susceptible to strong winds and seismic activities that may cause the surge arresters to malfunction and possibly disconnect.

BRIEF DESCRIPTION OF THE DISCLOSURE

Some or all of the above needs and/or problems may be addressed by certain embodiments of the disclosure. Certain embodiments can include an associated surge arrester system connected to the poles of a dead tank circuit breaker, where the surge arrester is supported by a post connected to the dead tank circuit breaker to ensure that the surge arrester system does not become disconnected from the poles. The surge arrester system also includes a current sensor that measures the current across the surge arrester system.

According to one embodiment, there is disclosed a circuit breaker apparatus that can include a middle tank portion, a first portion coupled to a first side of the middle tank portion, and a second portion coupled to a second side of the middle tank portion; a first high voltage terminal coupled to the first portion, and a second high voltage terminal coupled to the second portion, a post insulator supported and extending from the middle tank portion, and a first surge arrester connecting the first high voltage terminal to a first connector extending from the post insulator, and a second surge arrester connecting the second high voltage terminal to a second connector extending from the post insulator. The first surge arrester or the second surge arrestor can limit transient over-voltages occurring across the respective first high voltage terminal or second high voltage terminal when the circuit breaker is open.

According to another embodiment, there is disclosed a surge arrester structure that can include a post insulator supported and extending from a middle tank portion of a dead tank circuit breaker, a first surge arrester connecting a first high voltage terminal of a first bushing of the dead tank circuit breaker to a first connector extending from the post insulator, and a second surge arrester connecting a second high voltage terminal of a second bushing of the dead tank circuit breaker to a second connector extending from the post insulator. The first surge arrester or the second surge arrestor can limit transient over-voltages occurring across the respective first high voltage terminal or second high voltage terminal when the circuit breaker is open.

According to yet another embodiment, there is disclosed a method for limiting transient over-voltages occurring across a respective first high voltage terminal or second high voltage terminal of a circuit breaker. The method can include providing a middle tank portion, providing a first portion coupled to a first side of the middle tank portion, and a second portion coupled to a second side of the middle tank portion, providing a first high voltage terminal coupled to the first portion, and a second high voltage terminal coupled to the second portion; providing a post insulator supported and extending from the middle tank portion, and providing a first surge arrester connecting the first high voltage terminal to a first connector extending from the post insulator, and a second surge arrester connecting the second high voltage terminal to a second connector extending from the post insulator. The first surge arrester or the second surge arrestor can limit transient over-voltages occurring across the respective first high voltage terminal or second high voltage terminal when the circuit breaker is open.

Other embodiments, systems, methods, apparatuses, aspects, and features of the disclosure will become apparent to those skilled in the art from the following detailed description, the accompanying drawings, and the appended claims.

BRIEF DESCRIPTION OF THE FIGURES

The detailed description is set forth with reference to the accompanying drawings, which are not necessarily drawn to scale. The use of the same reference numbers in different figures indicates similar or identical items.

Certain implementations will now be described more fully below with reference to the accompanying drawings, in which various implementations and/or aspects are shown. Various aspects may, however, be implemented in many different forms and should not be construed as limited to the implementations set forth herein. Like numbers refer to like elements throughout. The following detailed description includes references to the accompanying drawings, which form part of the detailed description. The drawings depict illustrations, in accordance with example embodiments. These example embodiments, which are also referred to herein as "examples," are described in enough detail to enable those skilled in the art to practice the present subject matter. The example embodiments may be combined, other embodiments may be utilized, or structural, logical, and electrical changes may be made, without departing from the scope of the claimed subject matter. The following detailed description is, therefore, not to be taken in a limiting sense, and the scope is defined by the appended claims and their equivalents.

DETAILED DESCRIPTION

Illustrative embodiments will now be described more fully hereinafter with reference to the accompanying drawings, in which some, but not all embodiments of the disclosure are shown. The disclosure may be embodied in many different forms and should not be construed as limited to the embodiments set forth herein; rather, these embodiments are provided so that this disclosure will satisfy applicable legal requirements.

Illustrated embodiments herein are directed to, among other things, systems and methods for providing a surge arrester structure. Certain embodiments are directed to a surge arrester structure for electrical equipment such as a dead-tank circuit breaker. Technical effects of certain embodiments of the disclosure may include absorbing overvoltages over the dead-tank circuit breaker, thereby protecting circuit interrupters, contacts, and power electronics in the dead-tank circuit breaker from damage.

Figure 1:
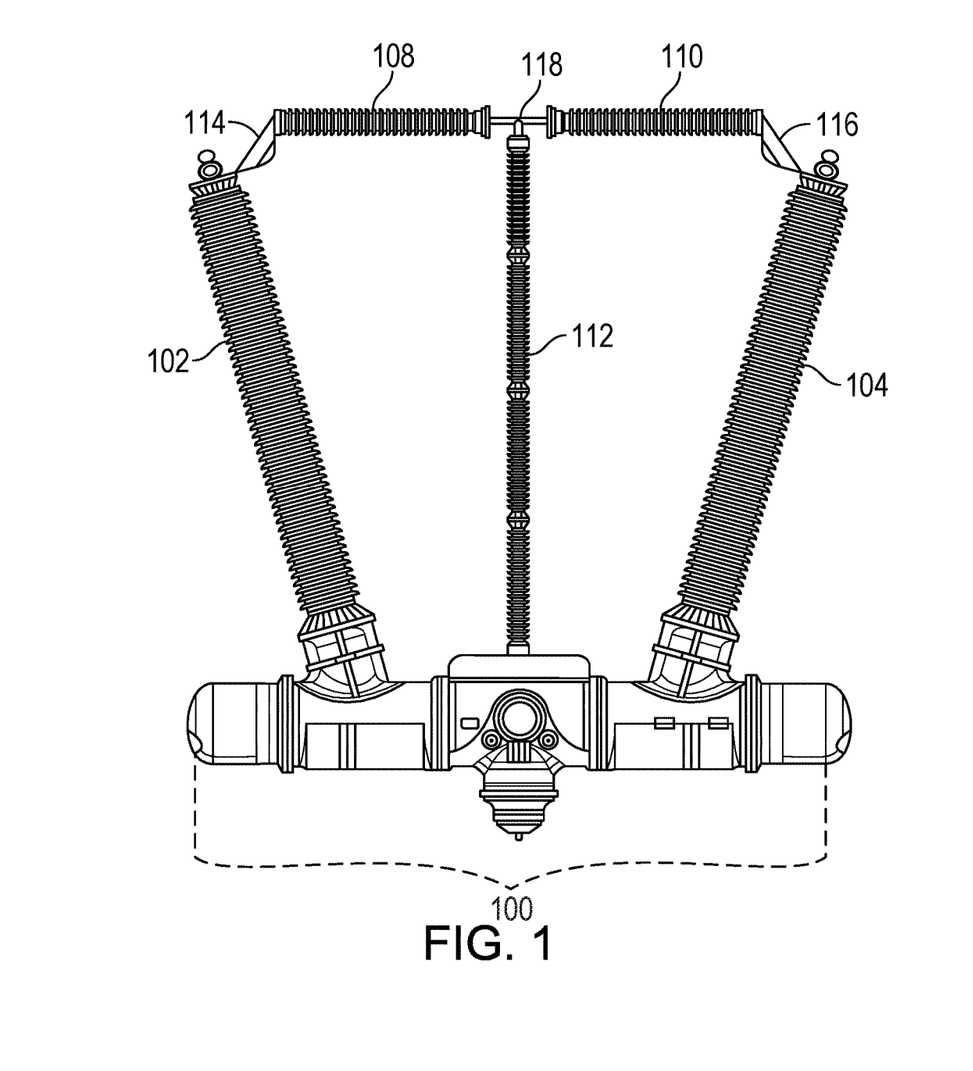
FIG. 1 depicts a front perspective view of an example dead tank circuit breaker surge arrester, according to one example embodiment.

FIG. 1 depicts a front perspective view of an example dead tank circuit breaker surge arrester, according to one example embodiment. Dead tank circuit breaker 100 may be a high voltage circuit breaker operating at earth potential. Dead tank circuit breaker 100 may support voltages between about 38 kV and about 550 kV. Dead tank circuit breaker 100 may be designed to operate within extreme environmental conditions including high elevation, very low and high temperatures (for example, about −60° C. (−76° F.) to about +60° C. (140° F.)), seismic zones, polluted areas and corrosive atmospheres. An interrupter may be included inside dead tank circuit breaker 100. The interrupter may use self-blast technology that significantly reduces the required mechanical energy to clear short-circuit currents. The interrupter may use arc energy to generate gas compression for the efficient quenching of the arc itself.

The interrupter has two gas volumes within the chamber, one mechanical and one thermal. The interrupter may ensure that the circuit breaker will interrupt short-circuit fault current from low level faults to the full nameplate rating. In some embodiments, the interrupter may be a single-pressure interrupter that uses partial duo-flow, self-blast technology to control and cool the sulfur hexafluoride (SF6) exhaust, ensuring proper gas density and dielectric strength while at the same time reducing the risk of contamination.

The interrupter housings may be made as single-piece aluminum castings, designed to ensure gas tightness and with safety margin for dielectric strength. The interrupter may also include a particle trap to provide an extra measure of dielectric strength and security.

Dead-tank circuit breaker 100 may have bushing 102 and bushing 104 affixed to it. There may be an electrical terminal at the top of bushing 102 and bushing 104. High voltage electrical lines are connected to the electrical terminals atop of bushing 102 and bushing 104. Bushing 102 may be supported by a pole and bushing 104 may be supported by a pole. The inside of the poles may be sealed and designed specifically to minimize arcing between contacts within dead-tank circuit breaker 100 that connect the electrical terminals atop of bushing 102 and bushing 104. The inside of the poles may include a dielectric material that includes SF6, dry air, dry nitrogen, carbon dioxide, or oil.

Dead-tank circuit breaker 100 may control the flow of energy between the two terminals by opening or closing a circuit connecting the two terminals. Dead-tank circuit breaker 100 may use a spring-spring mechanism to open and close the circuit connecting the two terminals.

A surge arrester structure may include surge arrester 108 and surge arrester 110. Surge arrester 108 may be horizontally mounted between the electrical terminal atop of bushing 102 and post structure 112, and surge arrester 110 may be horizontally mounted between the electrical terminal atop of bushing 104 and post insulator 112. Accordingly, the surge arrester structure is electrically connected to the contacts within dead-tank circuit breaker 100 via the high voltage electrical lines.

Surge arrester 108 and surge arrester 110 may be made of, for example, silicone. Surge arrester 108 may be electrically connected to the electrical terminal atop of bushing 102 via a connector structure 114. Surge arrester 108 may be electrically connected to the electrical terminal atop of bushing 104 via connector structure 114. Connector structure 114 may include a diagonally disposed line terminal that electrically and mechanically connects surge arrester 108 and the electrical terminal atop of bushing 102. Connector structure 116 may include a diagonally disposed line terminal that electrically and mechanically connects surge arrester 110 and the electrical terminal atop of bushing 104. Surge arrester 108 and surge arrester 110 can provide overvoltage protection of dead-tank circuit breaker 100. Under normal system conditions, the surge arresters 108 and 110 can appear as a high impedance path. When a surge reaches surge arresters 108 and 110, surge arresters 108 and 110 can change to a relatively low impedance path and may conduct only the current necessary to limit overvoltage. As a result, surge arresters 108 and 1110 can absorb minimum energy to protect and insulate the dead-tank circuit breaker 100 from an overvoltage event.

Surge arrester 108 and surge arrester 110 may include, for example, a metal oxide varistor element. In some embodiments, surge arrester 108 and surge arrester 110 may be made of, for example, porcelain. A porcelain surge arrester may support voltages between about 3 kilovolts (kV) and about 612 kV. In some instance, the porcelain surge arrester may support relatively extra high voltages of about 420 kV. The porcelain surge arrester may be mounted on a dead-tank circuit breaker as high as about 12,000 feet. In relatively extra high voltage applications, the surge arrester 108 and surge arrester 110 may incorporate a heat transfer system utilizing, for example, silicone-rubber material wedged between the metal oxide disk and internal porcelain wall. Accordingly, any heat generated in a valve element in surge arrester 108 or surge arrester 110 during a steady state, temporary, or transient condition may be transferred through the silicone-rubber material to the porcelain housing and then dissipated to the outside environment. In other embodiments, surge arrester 108 and surge arrester 110 may be made of, for example, a polymer. A polymer surge arrester may support voltages from about 3 kV to about 228 kV. The polymer surge arrester can transfer heat from the metal oxide elements to the outside environment.

The surge arresters, shown in FIG. 1 as surge arrester 108 and 110, can withstand temporary overvoltage (TOV). TOV may be caused by line-to-ground faults, circuit back feeding, load rejection, and/or ferroresonance. One primary effect of temporary overvoltages on metal oxide arresters can be increased current and power dissipation, and a rising arrester temperature.

When dead-tank circuit breaker 100 experiences an overvoltage, surge arrester 108 and surge arrester 110 can clamp the overvoltage that exceeds the overvoltage protective level rating for dead-tank circuit breaker 100. An overvoltage may occur when dead-tank circuit breaker 100 is being de-energized or one or more contacts in dead-tank circuit breaker 100 are open. When the one or more contacts in dead-tank circuit breaker 100 are closed, an overvoltage will not appear across surge arrester 108 and surge arrester 110.

Generally, the application of the described combination of circuit breaker 100 and surge arresters 108, 110 is for the purpose of performing switching operation on associated shunt reactors. The surge arresters 108, 110 can limit the overvoltage across the circuit breaker 100 during opening operations. During such operations, the circuit breaker 100 can chop the inductive current of an associated shunt reactor (suddenly cuts the current flowing into the shunt reactor before its natural zero crossing). Typically, most if not all, high voltage circuit breakers behave in such manner. As a result of current chopping, a high frequency voltage transient can be produced across the shunt reactor and also across the circuit breaker 100. Across the circuit breaker 100, a shunt reactor side transient can combine with the AC voltage on the supply side of the shunt reactor. This transient can appear across the contacts and, if the circuit breaker gap is relatively too short, this can cause a reignition. The purpose of the arresters 108, 110 is to limit the voltage below a certain value that reduces the number of reignitions and increase the life expectancy of the circuit breaker 100.

A post structure may include a post insulator (post insulator 112) made of, for example, epoxy resin with threaded inserts made of, for example, aluminum alloy, and may further include a surge arrester counter (current sensor 118). Current sensor 118 is mounted on post insulator 112 and may count the number of discharges from surge arrester 108 and surge arrester 110, as well as the amplitude of the surges, along with a date and time. Current sensor 118 may also measure the total current leakage and resistive current through surge arrester 110 and surge arrester 110. Surge arrester 108 and surge arrester 110 may be connected to post insulator 116 at a bifurcation point. Current sensor 118 may also be located at the bifurcation point in order to measure surges and monitor the current drawn through surge arrester 108 and surge arrester 110. Post structure 114 may be mounted to a middle portion of dead-tank circuit breaker 100.

Figure 2:
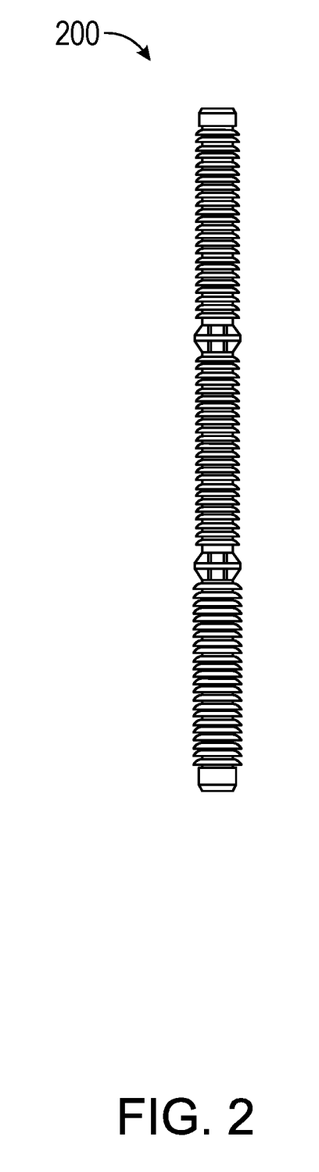
FIG. 2 depicts a front perspective view of an example post insulator, according to one example embodiment.

FIG. 2 depicts a front perspective view of porcelain post insulator, according to one example embodiment. Post insulator 200 may be, for example, a porcelain post insulator. In other embodiments, post insulator 200 may be made from clay, quartz, alumina, and/or feldspar, and may be covered with a smooth glaze to shed water. In some embodiments, post insulator 200 may be, for example, porcelain rich in alumina for relatively high mechanical strength. The dielectric strength of post insulator 200a may be about 4-10 kilo Volts per millimeter (kV/mm).

Figure 3:
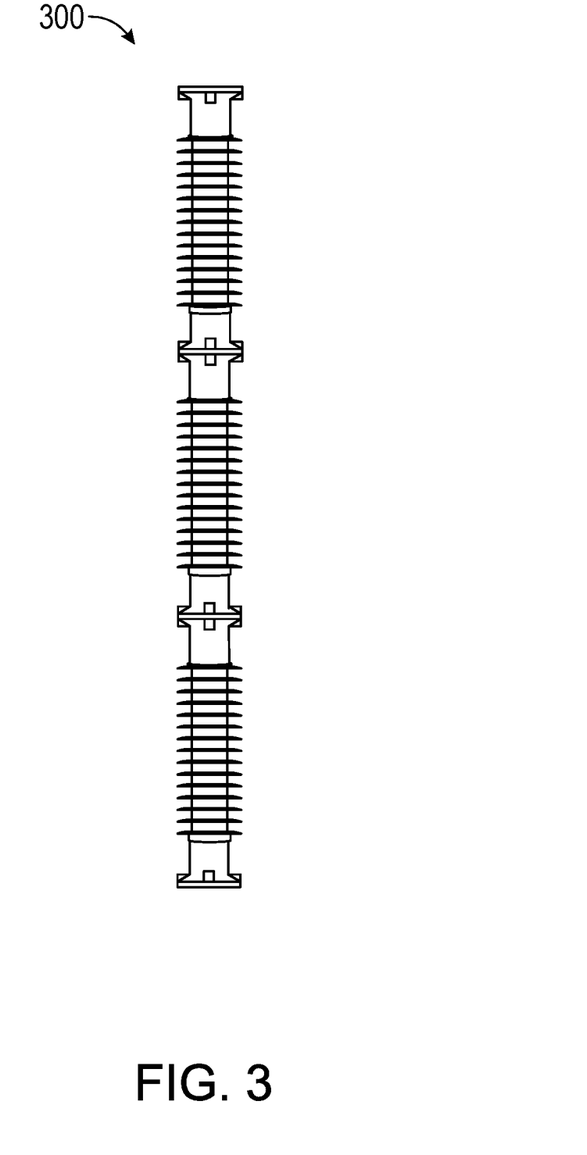
FIG. 3 depicts a front perspective view of another example post insulator, according to one example embodiment.

FIG. 3 depicts a front perspective view of composite post insulator, according to one example embodiment. Composite post insulator 300 may be made of, for example, a silicone rubber housing and weathersheds, a fiberglass core rod, and metal end fittings. Composite post insulator 300 may include, for example, two insulating parts—a core and housing. The core may be an internal insulating part of a composite insulator. The core carries the mechanical load of the surge arresters. The core may be made of, for example, glass fibers positioned in a resin matrix which can provide increased tensile strength. The housing is external to the core and can protect the core from relatively harsh environmental conditions. In some embodiments, the housing may be equipped with weathersheds. Yet still in other embodiments, composite insulators may employ a sheath made of insulating material between the weathersheds and the core. The sheath may be a part of the housing. The weathersheds are insulating parts, projecting from the housing and the sheath, and may increase the leakage distance and provide an interrupted path for water drainage. The composite insulator may also be fitted with end fittings that transfer the mechanical load of the surge arresters to the core.

Figure 4:
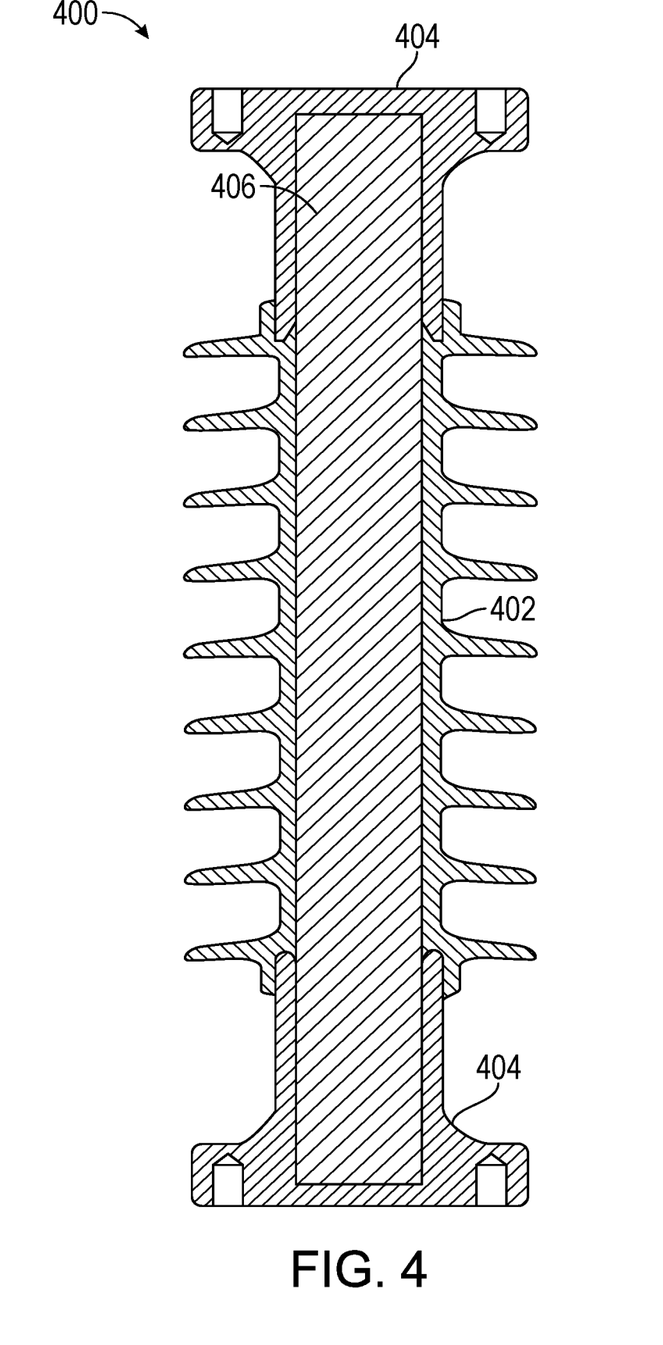
FIG. 4 depicts a cross section of yet another example post insulator and with embedded optic fiber, according to one example embodiment.

FIG. 4 depicts a cross section of a composite post insulator with embedded optic fiber, according to one example embodiment. Composite post insulator 400 may be similar in construction to composite post insulator 300 shown in FIG. 3, however composite post insulator 400 may include a fiber optic cable within the core. In some embodiments, core 402 may be made with, for example, a fiberglass reinforced epoxy resin. End fitting 404 may be made from, for example, iron with outer surfaces that are galvanized for corrosion protection. End fitting 404 may be joined to core 402 by, for example, a compression process thereby creating tensile rigidity between end fitting 404 and core 402. Fiber optic cable 406 may be immersed in a protective dielectric gel with which core 402 is filled. A containment tube may be used for the protection of fiber optic cable 406 inside the core 402. The containment tube may include a dielectric gel in which the fiber optic cable 465 is immersed.

As mentioned above a current sensor may monitor the surges and/or the current across surge arrester 108 and surge arrester 110. The current sensors may digitize this information and may transmit an optical signal along fiber optic cable 406 to a data collection device attached to dead-tank circuit breaker 100. The data collection device may transmit the digitized information to a remote server that may control the functioning of the contacts in dead-tank circuit breaker 100. For example, in some embodiments, the contacts in dead-tank circuit breaker 100 may open based on one or more current sensor measurements that indicate that there is an increase in current across surge arrester 108 and surge arrester 110. Conversely the contacts in dead-tank circuit breaker 100 may close based on one or more current sensors measurements that indicate that there is a decrease in the current across surge arrester 108 and surge arrester 110. The increase in current or surges may be due to seismic activity, lighting in and/or around dead-tank circuit breaker 100, or strong winds.

Figure 5:
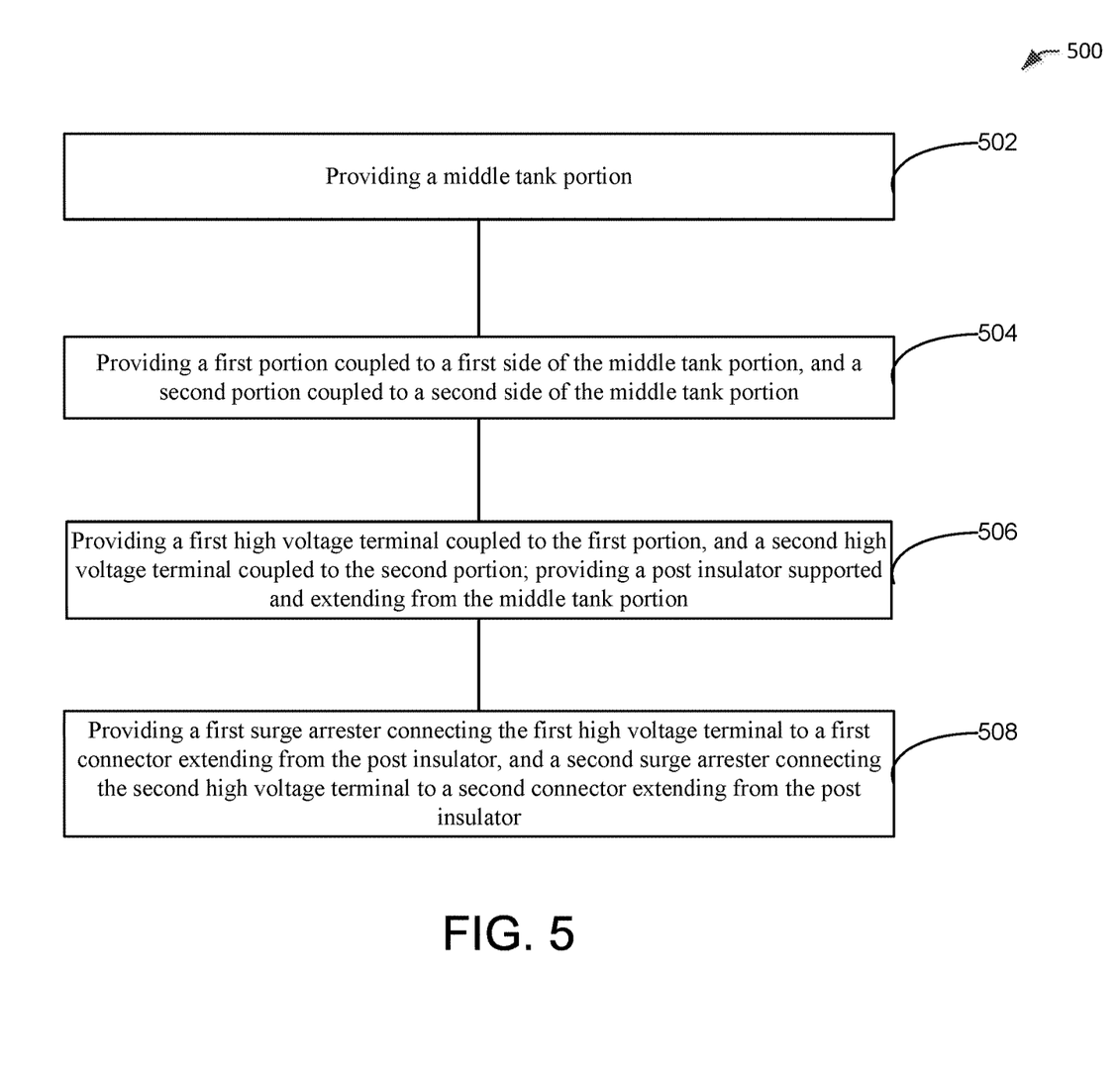
FIG. 5 illustrates an example method, according to an example embodiment.

FIG. 5 illustrates an example method of limiting overvoltages across the terminals of a dead tank circuit breaker, according to an example embodiment. At block 502 the method may include providing a middle tank portion. At block 504 the method may include providing a first portion coupled to a first side of the middle tank portion, and a second portion coupled to a second side of the middle tank portion. At block 506 the method may include providing a first high voltage terminal coupled to the first portion, and a second high voltage terminal coupled to the second portion; providing a post insulator supported and extending from the middle tank portion. At block 508 the method may include providing a first surge arrester connecting the first high voltage terminal to a first connector extending from the post insulator, and a second surge arrester connecting the second high voltage terminal to a second connector extending from the post insulator. The first surge arrester and/or the second surge arrestor limit transient over-voltages occurring across the respective first high voltage terminal or second high voltage terminal when the circuit breaker is open.

Many modifications and other embodiments of the example descriptions set forth herein to which these descriptions pertain will come to mind having the benefit of the teachings presented in the foregoing descriptions and the associated drawings. Thus, it will be appreciated that the disclosure may be embodied in many forms and should not be limited to the example embodiments described above. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A circuit breaker apparatus comprising:
   a middle tank portion;
   a first portion coupled to a first side of the middle tank portion, and a second portion coupled to a second side of the middle tank portion;
   a first high voltage terminal coupled to the first portion, and a second high voltage terminal coupled to the second portion;
   a post insulator supported and extending from the middle tank portion; and
   a first surge arrester connecting the first high voltage terminal to a first connector extending from the post insulator, and a second surge arrester connecting the second high voltage terminal to a second connector extending from the post insulator; wherein either the first surge arrester or the second surge arrestor can limit transient over-voltages occurring across the respective first high voltage terminal or second high voltage terminal when the circuit breaker is open.

2. The circuit breaker apparatus of claim 1, further comprising a bifurcation component connecting the post insulator to the first surge arrester and connecting the post insulator to the second surge arrester.

3. The circuit breaker apparatus of claim 2, further comprising one or more current sensors attached to the bifurcation component, wherein the one or more current sensors measure
   a first current in the first surge arrestor, and
   a second current in the second surge arrestor.

4. The circuit breaker apparatus of claim 3, further comprising an optical fiber connecting the one or more current sensors to a data collection device connected to the middle tank, wherein the optical fiber transfers current sensor measurements from the one or more current sensors to the data collection device.

5. The circuit breaker apparatus of claim 3, further comprising an optical fiber connecting the one or more current sensors to a data collection device connected to the middle tank, wherein the optical fiber transfers surge arrester commands from a remote server to the first surge arrester or the second surge arrester via a processor in the data collection device.

6. The circuit breaker apparatus of claim 1, wherein the post insulator supports the first surge arrester and the second surge arrester in response to a seismic event or high wind.

7. The circuit breaker apparatus of claim 1, wherein the circuit breaker apparatus surge opens in response to an increase in reactive power above an upper reactive power threshold or a decrease in reactive power below a lower reactive power threshold in the circuit breaker apparatus.

8. The circuit breaker apparatus of claim 7, wherein the first surge arrester or second surge arrester limit the voltage across the circuit breaker responsive to the increase in reactive power above the upper reactive power threshold or the decrease in reactive power below the lower reactive power threshold.

9. The circuit breaker apparatus of claim 1, wherein the circuit breaker apparatus surge opens in response to a voltage exceeding a voltage threshold.

10. The circuit breaker apparatus of claim 9, wherein the first surge arrester or second surge arrester limit the voltage across the circuit breaker responsive to the voltage exceeding the upper voltage threshold.

11. The circuit breaker apparatus of claim 1, wherein the circuit breaker apparatus closes in response to a voltage being below a voltage threshold, and the first surge arrester or second surge arrester allow the voltage across the circuit breaker.

12. A surge arrester structure comprising:
    a post insulator supported and extending from a middle tank portion of a dead tank circuit breaker;
    a first surge arrester connecting a first high voltage terminal of a first bushing of the dead tank circuit breaker to a first connector extending from the post insulator, and a second surge arrester connecting a second high voltage terminal of a second bushing of the dead tank circuit breaker to a second connector extending from the post insulator;
    wherein either the first surge arrester or the second surge arrestor can limit transient over-voltages occurring across the respective first high voltage terminal or second high voltage terminal when the circuit breaker is open.

13. The surge arrester structure of claim 12, further comprising a bifurcation component connecting the post insulator to the first surge arrester and connecting the post insulator to the second surge arrester.

14. The surge arrester structure of claim 13, further comprising one or more current sensors attached to the bifurcation component, wherein the one or more current sensors measure:
    a first current in the first surge arrestor, and
    a second current in the second surge arrestor.

15. The surge arrester structure of claim 14, further comprising an optical fiber connecting the one or more current sensors to a data collection device connected to the middle tank, wherein the optical fiber transfers current sensor measurements from the one or more current sensors to the data collection device.

16. The surge arrester structure of claim 14, further comprising an optical fiber connecting the one or more current sensors to a data collection device connected to the middle tank, wherein the optical fiber transfers surge arrester commands from a remote server to the first surge arrester or the second surge arrester via a processor in the data collection device.

17. The surge arrester structure of claim 12, wherein the post insulator supports the first surge arrester and the second surge arrester in response to a seismic event or high wind.

18. The surge arrester structure of claim 12, wherein the dead tank circuit breaker opens in response to an increase in reactive power above an upper reactive power threshold or a decrease in reactive power below a lower reactive power threshold in the dead tank circuit breaker.

19. A method for limiting transient over-voltages occurring across a respective first high voltage terminal or second high voltage terminal of a circuit breaker comprising:
   providing a middle tank portion;
   providing a first portion coupled to a first side of the middle tank portion, and a second portion coupled to a second side of the middle tank portion;
   providing a first high voltage terminal coupled to the first portion, and a second high voltage terminal coupled to the second portion; providing a post insulator supported and extending from the middle tank portion; and
   providing a first surge arrester connecting the first high voltage terminal to a first connector extending from the post insulator, and a second surge arrester connecting the second high voltage terminal to a second connector extending from the post insulator; wherein either the first surge arrester or the second surge arrestor limit transient over-voltages occurring across the respective first high voltage terminal or second high voltage terminal when the circuit breaker is open.

20. The method of claim 19, wherein the first surge arrester or second surge arrester limit transient over-voltages occurring across the respective first high voltage terminal or the second high voltage terminal responsive to a voltage across the respective first high voltage terminal or the second high voltage terminal exceeding an upper voltage threshold.

* * * * *